United States Patent
Shyu

(10) Patent No.: US 6,727,958 B1
(45) Date of Patent: Apr. 27, 2004

(54) METHOD AND APPARATUS FOR DISPLAYING RESIZED PICTURES ON AN INTERLACED TARGET DISPLAY SYSTEM

(75) Inventor: Rong-Fuh Shyu, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/378,042

(22) Filed: Aug. 20, 1999

(51) Int. Cl.[7] ............................. H04N 9/74; H04N 5/91
(52) U.S. Cl. ..................... 348/581; 348/556; 348/558; 348/445; 348/446; 348/443; 348/454; 386/131
(58) Field of Search ................................. 348/556, 558, 348/581, 459, 445, 446, 443, 454; 386/131, 125–126, 124

(56) References Cited

U.S. PATENT DOCUMENTS

| | | | |
|---|---|---|---|
| 5,473,381 A | * 12/1995 | Lee | 348/441 |
| 5,621,870 A | * 4/1997 | Shyu et al. | 345/671 |
| 5,631,710 A | * 5/1997 | Kamogawa et al. | 348/555 |
| 5,796,442 A | * 8/1998 | Gove et al. | 348/556 |
| 5,831,673 A | * 11/1998 | Przyborski et al. | 348/239 |
| 5,912,710 A | * 6/1999 | Fujimoto | 348/445 |
| 6,046,721 A | * 4/2000 | Song et al. | 345/132 |
| 6,118,486 A | * 9/2000 | Reitmeier | 348/441 |
| 6,141,055 A | * 10/2000 | Li | 348/446 |
| 6,147,712 A | * 11/2000 | Shimamoto et al. | 348/446 |
| 6,151,074 A | * 11/2000 | Werner | 348/425.1 |
| 6,205,288 B1 | * 3/2001 | Gong | 386/131 |

* cited by examiner

Primary Examiner—John Miller
Assistant Examiner—Annan Q. Shang
(74) Attorney, Agent, or Firm—Christensen O'Connor Johnson Kindness PLLC

(57) ABSTRACT

In a method and apparatus for displaying resized pictures on an interlaced target display system, the contents of an input video source are initially read and decoded to obtain original input picture data and title format information that indicates scan format of the original input picture data. According to the scan format of the original picture data and the identified television system specification of the interlaced target display system, a resizing operation is then performed to resize the original input picture data and obtain resized frames having a frame size sufficient for division into even and odd fields with field size characteristics that comply with the television system specification of the interlaced target display system. The resized frames are stored in a resize memory, and the resize memory is subsequently controlled to output the resized frames in the form of the even and odd fields with a timing sequence that complies with field scanning characteristics of the television system specification of the interlaced target display system.

23 Claims, 5 Drawing Sheets

METHOD AND APPARATUS FOR DISPLAYING RESIZED PICTURES ON AN INTERLACED TARGET DISPLAY SYSTEM

BACKGROUND OF THE INVENTION

1. Field of the Invention

The invention relates to a method and apparatus for digital video processing, more particularly to a method and apparatus for displaying resized pictures on an interlaced target display system.

2. Description of the Related Art

Presently, pictures in a video compact disc (VCD) title are generally encoded in one of the following three source-input formats (SIF) 352×240 at 29.97 Hz; 352×240 at 23.976 Hz; and 352×288 at 25 Hz. Different formats are used in different source materials that were published in different areas of the globe to match the television system adopted by the particular area. For example, the 352×240 at 29.97 Hz scan format is adopted by programs suitable for the NTSC system, which is widely used in North America and Japan. The 352×240 at 23.976 Hz scan format is adopted for motion picture films. The 352×288 at 25 Hz scan format, which offers a higher picture height, is adopted by programs suitable for the PAL system that is popular in both Europe and China. Since it is desirable for the published video CD to be exchangeable worldwide, the video CD player must be made to allow the display of the aforementioned video formats on different television system specifications.

The two most popular commercial television system specifications in the world are the NTSC and PAL scan formats. The NTSC scan format has a vertical refresh rate of 59.94 Hz, whereas the PAL scan format has a vertical refresh rate of 50 Hz. Both scan formats use interlaced scanning to reduce flicker. In order to target a video CD title for display on these two television systems, it is inevitable to enhance the picture elements to reach the scan resolution required by the two systems. For example, the SIF picture resolution is at least required to be increased to two times in both vertical and horizontal directions. Thus, in a typical NTSC television system, the usual frame resolution is 704×480 at 29.97 Hz, and this frame is split into odd and even fields, each for scanning within a field rate of 1/59.94 Hz.

In addition to the spatial resolution enhancement, there is also a need to adapt the temporal resolution to another format so as to avoid jittering due to differences in the frame rate and scan rate between the encoded video CD title and the target display system. This action is called frame rate conversion and makes it possible to display NTSC-encoded frames on a PAL television system, and vice versa. In general, frame rate conversion is needed for video CD titles involving the aforementioned three kinds of SIF scan formats to permit display on both NTSC and PAL television monitors.

A well-known 3:2 pull-down technique is used as a conversion for targeting motion picture film titles on an NTSC display since a 5-field time period of the NTSC display is equal to the time period of two motion picture film frames. As such, one motion picture film frame is displayed over two consecutive fields, followed by the display of the other motion picture film frame over three consecutive fields, so that motion picture film frames can be played back smoothly on the NTSC display. However, the 3:2 pull-down technique uses identical picture contents to be repeated for the corresponding two fields and three fields for two consecutive motion picture film frames. This will result in a picture-shaking phenomenon when the frames are applied to an interlaced display device.

Therefore, to display SIF-formatted video CD frames on a target television system of 625-lines/50 HZ (PAL) or 525-lines/59.94 Hz (NTSC) that have 576 and 480 active lines respectively in a frame time, there is a need to modify the picture size as well as the frame rate for various formatted titles to suit the interlaced display device and to provide enough resolution from a spatial point of view and maintain continuity of motion from a temporal point of view.

SUMMARY OF THE INVENTION

The object of the present invention is to provide a method and apparatus for displaying SIF-encoded source pictures on an interlaced television system for enriching the resolution, reducing line flicker, preserving picture aspect ratio, and maintaining good continuity of motion.

According to one aspect of the invention, a method for displaying resized pictures on an interlaced target display system comprises: reading contents of an input video source; decoding the contents of the input video source to obtain original input picture data and title format information that indicates scan format of the original input picture data; identifying television system specification of the interlaced target display system; according to the scan format of the original input picture data and the television system specification of the interlaced target display system, performing a resizing operation to resize the original input picture data and obtain resized frames having a frame size sufficient for division into even and odd fields with field size characteristics that comply with the television system specification of the interlaced target display system; storing the resized frames in a resize memory; and according to the scan format of the original input picture data and the television system specification of the interlaced target display system, controlling the resize memory to output the resized frames in the form of the even and odd fields with a timing sequence that complies with field scanning characteristics of the television system specification of the interlaced target display system.

According to another aspect of the invention, an apparatus for displaying resized pictures on an interlaced target display system comprises a video input unit, a video decoder unit, a target system selector, a resize filter, a resize memory and a display controller. The video input unit is adapted to read contents of an input video source. The video decoder unit is connected to the video input unit, and is adapted to decode the contents of the input video source from the video input unit to obtain original input picture data and title format information that indicates scan format of the original input picture data. The target system selector is operable so as to generate a select signal to identify television system specification of the interlaced target display system. The resize filter is connected to the video decoder unit and the target system selector, and receives the title format information and the select signal therefrom. The resize filter performs a resizing operation to resize the original input picture data from the video decoder unit and obtain resized frames having a frame size sufficient for division into even and odd fields with field size characteristics that comply with the television system specification of the interlaced target display system. The resize memory is connected to the resize filter for storing the resized frames therein. The display controller is connected to the video decoder unit and the target system selector, and receives the title format information and the select signal therefrom. The display controller is further connected to and controls the resize memory to output the resized frames in the form of the even and odd fields with a timing sequence that complies with field scanning characteristics of the television system specification of the interlaced target display system.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
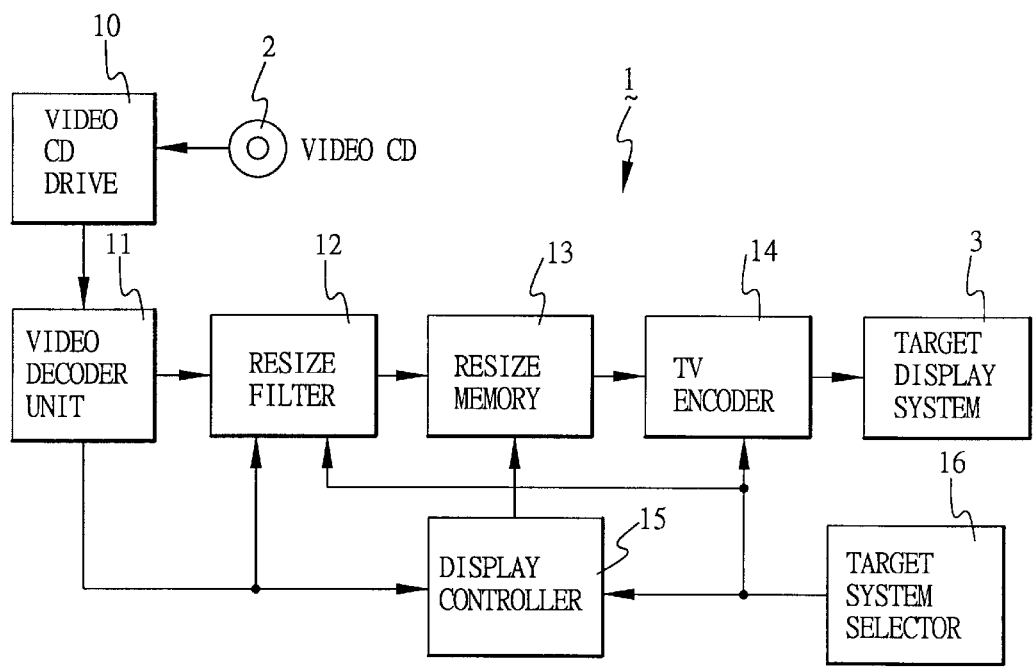
FIG. 1 is a schematic circuit block diagram of the preferred embodiment of a resized-picture displaying apparatus according to the present invention.

Referring to FIG. 1, the preferred embodiment of a resized-picture displaying apparatus 1 according to the present invention is shown to comprise a video input unit or video CD drive 10, a video decoder unit 11, a resize filter 12, a resize memory 13, a television encoder 14, a display controller 15, and a target system selector 16.

The video CD drive 10 is adapted to be loaded with a video CD 2, which serves as an input video source, and is adapted to read contents of the latter.

The video decoder unit 11 is connected to the video CD drive 10 and receives the contents of the video CD 2 from the latter. The video decoder unit 11 is adapted to decode the contents of the video CD 2, and to obtain original input picture data and title format information that indicates the scan format of the original input picture data. In this embodiment, the scan format of the original input picture data is one of an NTSC source-input format, a motion picture film source-input format, and a PAL source-input format.

The target system selector 16 is operable so as to generate a select signal to identify the television system specification of an interlaced target display system 3. In this embodiment, the target display system 3, such as a television monitor, is one of an NTSC-compliant target display system and a PAL-compliant target display system.

The resize filter 12 is connected to the video decoder unit 11, and receives the original input picture data and the title format information therefrom. The resize filter 12 is further connected to the target system selector 16, and receives the select signal therefrom. According to the title format information and the select signal, the resize filter 12 performs a resizing operation to resize the original input picture data and obtain resized frames having a frame size sufficient for division into even and odd fields with field size characteristics that comply with the television system specification of the target display system 3. The resizing algorithm resident in the resize filter 12 is not the subject of the present application. One example of the resizing algorithm that can be used in the present application is disclosed in U.S. Pat. No. 5,621,870, entitled "Method and Apparatus for Uniformly Scaling a Digital Image," by the applicant.

The resize memory 13 is connected to the resize filter 12 and is used to store the resized frames therein.

The display controller 15 is connected to the video decoder unit 11, the target system selector 16 and the resize memory 13. The display controller 15 receives the title format information from the video decoder unit 11 and the select signal from the target system selector 16, and is responsive to the same so as to control the resize memory 13 to output the resized frames in the form of the even and odd fields with a timing sequence that complies with field scanning characteristics of the television system specification of the target display system 3.

The television encoder 14 is connected to the resize memory 13 and the target system selector 16, and is adapted to be connected to the target display system 3. The television encoder 14 is capable of encoding and converting the output of the resize memory 13 to obtain a converted output in an analog format that complies with video characteristics of the television system specification of the target display system 3. The television encoder 14 is adapted to provide the converted output to the target display system 3.

Figure 2:
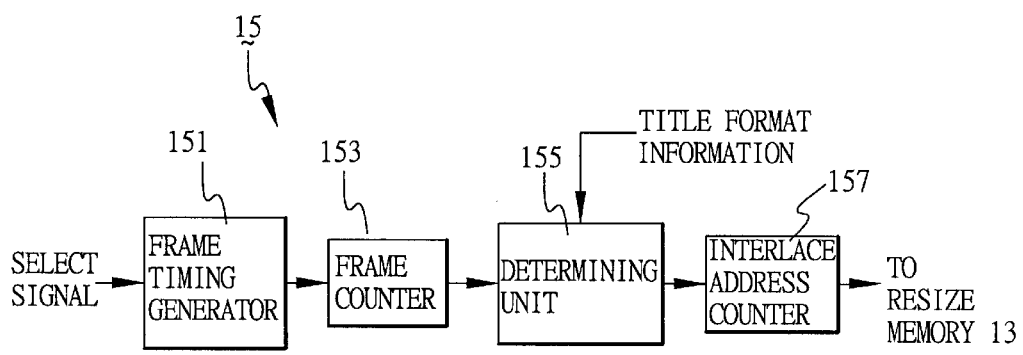
FIG. 2 is a schematic circuit block diagram of a display controller of the preferred embodiment.

Referring to FIG. 2, the display controller 15 includes a frame timing generator 151, a frame counter 153, a determining unit 155 and an interlace address counter 157.

The frame timing generator 151 is connected to the target system selector 16, and is operable so as to generate frame rate signals corresponding to frame scanning characteristics of the television system specification of the target display system 3 in response to the select signal received from the target system selector 16. The frame counter 153 is connected to the frame timing generator 151, and performs a counting operation to generate a count output corresponding to the frame rate signals from the latter. A frame time consists of an even field time and an odd field time. The interlace address counter 157 is connected to the resize memory 13 to control the output of the resized frames therefrom. Particularly, the interlace address counter 157 counts a set of consecutive even addresses that correspond to even lines of the resized frames during the even field times, and a set of consecutive odd addresses that correspond to odd lines of the resized frames during the odd field times. The determining unit 155 is connected to the frame counter 153, the video decoder unit 11 and the interlace address counter 157. Based on the count output from the frame counter 153 and the title format information from the video decoder unit 11, the determining unit 155 determines an addressing sequence for the interlace address counter 157 to address the resized frames stored in the resize memory 13.

Figure 3:
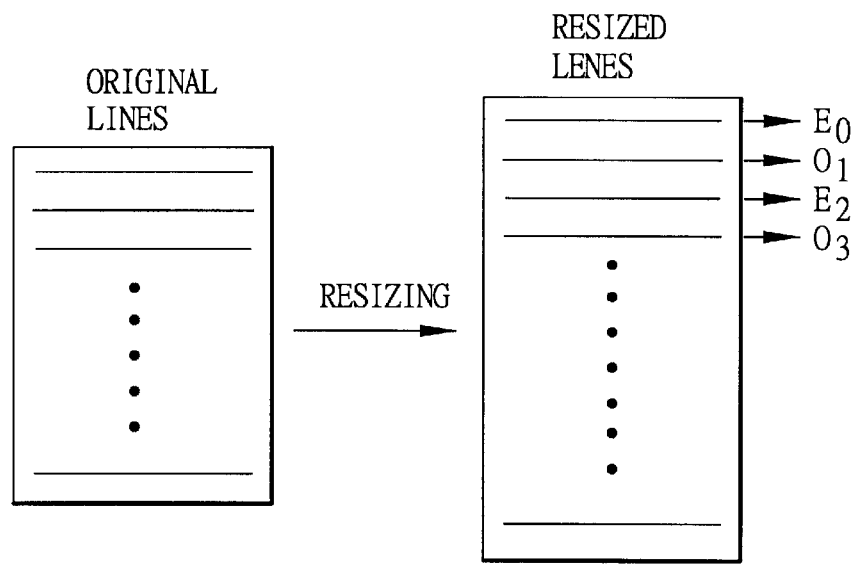
FIG. 3 illustrates the resizing operation of a resize filter of the preferred embodiment.

FIG. 3 illustrates the resizing operation of the resize filter 12. By virtue of the resize filter 12, the original input picture data having original lines of SIF size undergo a resizing operation to become a resized frame having resized lines that can be split into even lines E0, E2, . . . etc. and odd lines 01, 03, . . . etc. The even lines will be displayed during an even field time, while the odd lines will be displayed during an odd field time.

Figure 4:
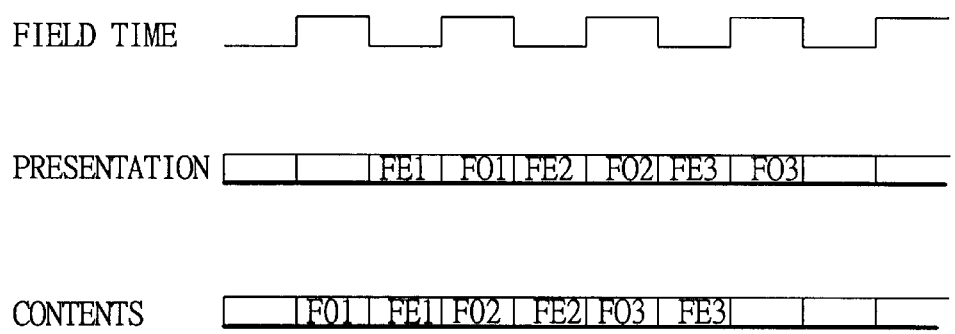
FIG. 4 illustrates presentation contents in corresponding field time when the preferred embodiment is used to display an NTSC-formatted title onto an NTSC-compliant target display system.

Referring to FIG. 4, when the preferred embodiment is used to display an NTSC-formatted title onto an NTSC-compliant target display system 3, the original input picture data is first resized to obtain corresponding resized frames. Then, the even lines of the resized frames are outputted during the corresponding even field times, while the odd lines of the resized frames are outputted during the corresponding odd field times. Each resized frame is outputted in two successive even and odd fields. As shown in FIG. 4, the logic high level of the field time represents an odd field time, whereas the logic low level of the field time represents an even field time. FEn represents the contents of an even field containing even lines of an (n)th resized frame. FOn represents the contents of an odd field containing odd lines of the (n)th resized frame. The presenting sequence for every resized frame can start from an even field time, as shown in the upper row of the presentation contents of FIG. 4, or an odd field time, as shown in the lower row of the presentation contents of FIG. 4.

Figure 5:
FIG. 5 illustrates presentation contents in corresponding field time when the preferred embodiment is used to display a motion picture film-formatted title onto an NTSC-compliant target display system.
Figure 5:
Figure 5:

Referring to FIG. 5, when the preferred embodiment is used to display a motion picture film-formatted title onto an NTSC-compliant target display system 3, the original input picture data is first resized to obtain corresponding resized frames. Then, every two resized frames are outputted in five successive field times. For example, a first resized frame has the even lines (FE1) outputted in an even field time, and the odd lines (FO1) outputted in an immediately succeeding odd field time. After the first resized frame, a second resized frame has the even lines (FE2) outputted in an immediately succeeding even field time, the odd lines (FO2) outputted in an immediately succeeding odd field time, and the even lines (FE2) outputted once again in an immediately succeeding even field time. Like the example of FIG. 4, the logic high level of the field time represents an odd field time, whereas the logic low level of the field time represents an even field time. FEn represents the contents of an even field containing even lines of an (n)th resized frame. FOn represents the contents of an odd field containing odd lines of the (n)th resized frame. The presenting sequence can start from an even field time, as shown in the upper row of the presentation contents of FIG. 5, or an odd field time, as shown in the lower row of the presentation contents of FIG. 5.

Figure 6:
FIG. 6 illustrates presentation contents in corresponding field time when the preferred embodiment is used to display a PAL-formatted title onto an NTSC-compliant target display system.
Figure 6:
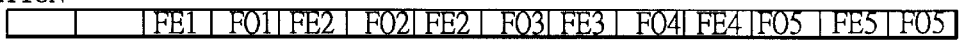
Figure 6:
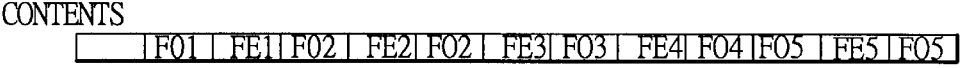

Referring to FIG. 6, when the preferred embodiment is used to display a PAL-formatted title onto an NTSC-compliant target display system 3, the original input picture data is first resized to obtain corresponding resized frames. Then, every five resized frames are outputted in twelve successive field times. In the upper row of the presentation contents of the example of FIG. 6, presentation starts from an even field time. A first resized frame comprising even and odd lines (FE1), (FO1) is outputted in the first two field times. A second resized frame comprising even and odd lines (FE2), (FO2) is outputted in the next three field times. A third resized frame comprising odd and even lines (FO3), (FE3) is outputted in the next two field times. A fourth resized frame comprising odd and even lines (FO4), (FE4) is outputted in the next two field times. A fifth resized frame comprising odd and even lines (FO5), (FE5) is outputted in the next three field times. Even lines of each resized frame are outputted in the corresponding even field time, while odd lines of each resized frame are outputted in the corresponding odd field time. Like the previous examples, the logic high level of the field time represents an odd field time, while the logic low level of the field time represents an even field time. FEn represents the contents of an even field containing even lines of an (n)th resized frame. FOn represents the contents of an odd field containing odd lines of the (n)th resized frame. Accordingly, the presenting sequence can also start from an odd field time, as shown in the lower row of the presentation contents of FIG. 6.

Figure 7:
FIG. 7 illustrates presentation contents in corresponding field time when the preferred embodiment is used to display a PAL-formatted title onto a PAL-compliant target display system.
Figure 7:
Figure 7:

Referring to FIG. 7, when the preferred embodiment is used to display a PAL-formatted title onto a PAL-compliant target display system 3, the original input picture data is first resized to obtain corresponding resized frames. Then, the even lines of the resized frames are outputted during the corresponding even field times, while the odd lines of the resized frames are outputted during the corresponding odd field times. Each resized frame is outputted in two successive even and odd fields. The logic high level of the field time represents an odd field time, whereas the logic low level of the field time represents an even field time. FEn represents the contents of an even field containing even lines of an (n)th resized frame. FOn represents the contents of an odd field containing odd lines of the (n)th resized frame. Like the example of FIG. 4, the presenting sequence for every resized frame can start from an even field time, as shown in the upper row of the presentation contents of FIG. 7, or an odd-field time, as shown in the lower row of the presentation contents of FIG. 7.

Figure 8:
FIG. 8 illustrates presentation contents in corresponding field time when the preferred embodiment is used to display an NTSC-formatted title onto a PAL-compliant target display system.
Figure 8:
Figure 8:

Referring to FIG. 8, when the preferred embodiment is used to display an NTSC-formatted title onto a PAL-compliant target display system 3, the original input picture data is resized to obtain corresponding resized frames. Then, every six resized frames are outputted in ten successive field times. In the upper row of the presentation contents of the example of FIG. 8, presentation starts from an even field time. A first resized frame comprising even and odd lines (FE1), (FO1) is outputted in the first two field times. A second resized frame comprising even and odd lines (FE2), (FO2) is outputted in the next two field times. Even lines (FE3) of a third resized frame are outputted in the next even field time. A fourth resized frame comprising odd and even lines (FO4), (FE4) is outputted in the next two field times. A fifth resized frame comprising odd and even lines (FO5), (FE5) is outputted in the next two field times. Odd lines (FO6) of a sixth resized frame are outputted in the next odd field time. Like the previous examples, the logic high level of the field time represents an odd field time, while the logic low level of the field time represents an even field time. FEn represents the contents of an even field containing even lines of an (n)th resized frame. FOn represents the contents of an odd field containing odd lines of the (n)th resized frame. Accordingly, the presenting sequence can start from an odd field time, as shown in the lower row of the presentation contents of FIG. 8. In this case, only the odd field lines (FO3) are outputted in the corresponding odd field time for the third resized frame, and only the even field lines (FE6) are outputted in the corresponding even field time for the sixth resized frame.

Figure 9:
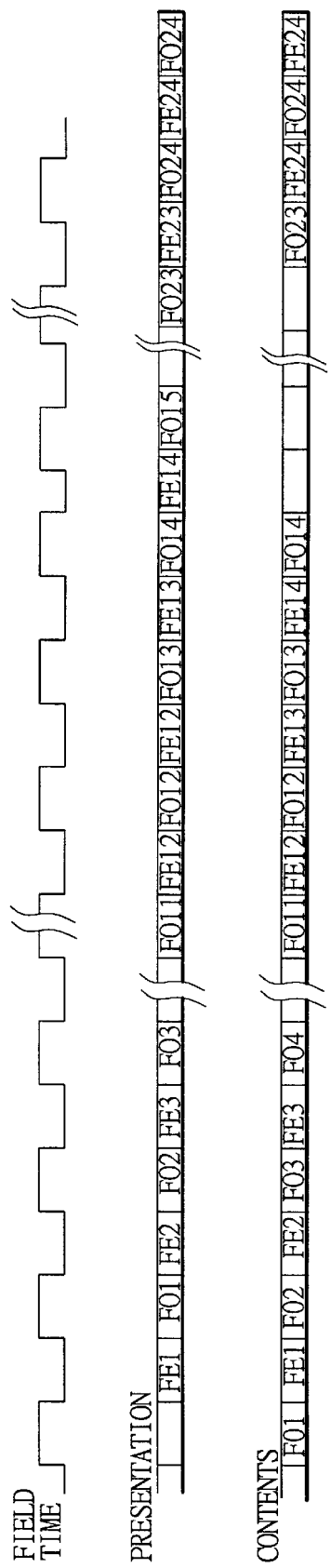
FIG. 9 illustrates presentation contents in corresponding field time when the preferred embodiment is used to display a motion picture film-formatted title onto a PAL-compliant target display system.

Referring to FIG. 9, when the preferred embodiment is used to display a motion picture film-formatted title onto a PAL-compliant target display system 3, the original input picture data is first resized to obtain corresponding resized frames. Then, every twelve resized frames are outputted in twenty-five successive field times. In this example, each of the first to eleventh resized frames is outputted in two immediately succeeding field times. The twelfth resized frame is outputted over three immediately succeeding field times. Like the previous examples, the logic high level of the field time represents an odd field time, while the logic low level of the field time represents an even field time. FEn represents the contents of an even field containing even lines of an (n)th resized frame. FOn represents the contents of an odd field containing odd lines of the (n)th resized frame. The presenting sequence can start from an even field time, as shown in the upper row of the presentation contents of FIG. 9, or an odd field time, as shown in the lower row of the presentation contents of FIG. 9. When presentation of the first twelve resized frames is started from an even field time, presentation of the next twelve resized frames should start from an odd field time, and vice versa.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method for displaying resized pictures of a motion video on an interlaced target display system, comprising:

reading contents of an input video source;

decoding the contents of the input video source to obtain original input picture data and title format information that indicates scan format of the original input picture data including the original scanning rate of the input picture data, wherein the original input picture data does not comply with a television system specification of the interlaced target display system;

identifying a television system specification of the interlaced target display system including field scanning characteristics of the interlaced target display system, wherein the television system specification is generated by a target system selector;

according to the scan format of the original input picture data and the television system specification of the interlaced target display system, performing a resizing operation to resize the original input picture data and obtain resized frames having a frame size sufficient for division into even and odd fields with field size characteristics that comply with the television system specification of the interlaced target display system; and storing the resized frames in a resize memory; and according to the scan format of the original input picture data including the original scanning rate and the television system specification of the interlaced target display system including the field scanning characteristics, adjusting a frame rate by controlling the resize memory to output the resized frames in a corresponding predetermined form of alternating the even and odd fields with a timing sequence that complies with the field scanning characteristics of the television system specification of the interlaced target display system.

2. The method of claim 1, wherein the interlaced target display system is one of an NTSC-compliant target display system and a PAL-compliant target display system.

3. The method of claim 1, wherein the scan format of the original input picture data is one of an NTSC source-input format, a motion picture film source-input format, and a PAL source-input format.

4. The method of claim 1, further comprising the step of encoding and converting the output of the resize memory to obtain a converted output in an analog format that complies with video characteristics of the television system specification of the interlaced target display system, and providing the converted output to the interlaced target display system.

5. The method of claim 1, wherein:

when the scan format of the original input picture data is an NTSC source-input format, and the interlaced target display system is an NTSC-compliant target display system, the resize memory is controlled such that the even and odd fields of each of the resized frames are outputted in two immediately succeeding even and odd field times.

6. The method of claim 1, wherein:

when the scan format of the original input picture data is a motion picture film source-input format, and the interlaced target display system is an NTSC-compliant target display system, the resize memory is controlled such that the even and odd fields of every two of the resized frames are outputted in five immediately succeeding even and odd field times.

7. The method of claim 1, wherein:

when the scan format of the original input picture data is a PAL source-input format, and the interlaced target display system is an NTSC-compliant target display system, the resize memory is controlled such that the even and odd fields of every five of the resized frames are outputted in twelve immediately succeeding even and odd field times.

8. The method of claim 1, wherein:

when the scan format of the original input picture data is a PAL source-input format, and the interlaced target display system is a PAL-compliant target display system, the resize memory is controlled such that the even and odd fields of each of the resized frames are outputted in two immediately succeeding even and odd field times.

9. The method of claim 1, wherein:

when the scan format of the original input picture data is an NTSC source-input format, and the interlaced target display system is a PAL-compliant target display system, the resize memory is controlled such that the even and odd fields of every six of the resized frames are outputted in ten immediately succeeding even and odd field times.

10. The method of claim 1, wherein:

when the scan format of the original input picture data is a motion picture film source-input format, and the interlaced target display system is a PAL-compliant target display system, the resize memory is controlled such that the even and odd fields of every twelve of the resized frames are outputted in twenty-five immediately succeeding even and odd field times.

11. The method of claim 1, wherein the input video source is a video compact disc.

12. An apparatus for displaying resized pictures of a motion video on an interlaced target display system, comprising:

a video input unit adapted to read contents of an input video source, wherein the original input picture data does not comply with a television system specification of the interlaced target display system;

a video decoder unit connected to said video input unit and adapted to decode the contents of the input video source from said video input unit to obtain original input picture data and title format information that indicates scan format of the original input picture data including the original scanning rate of the input picture data;

a target system selector operable so as to generate a select signal to identify television system specification of the interlaced target display system including field scanning characteristics of the interlaced target display system;

a resize filter connected to said video decoder unit and said target system selector so as to receive the title format information and the select signal therefrom, said resize filter performing a resizing operation to resize the original input picture data from said video decoder unit and obtain resized frames having a frame size sufficient for division into even and odd fields with field size characteristics that comply with the television system specification of the interlaced target display system;

a resize memory connected to said resize filter for storing the resized frames therein; and a display controller connected to said video decoder unit and said target system selector so as to receive the title format information and the select signal therefrom, said display controller being further connected to said resize memory and, according to the scan format of the original input picture data including the original scanning rate and the television system specification of the interlaced target display system including the field scanning characteristics, adjusting a frame rate by controlling said resize memory to output the resized frames in a corresponding predetermined form of alternating the even and odd fields with a timing sequence that complies with the field scanning characteristics of the television system specification of the interlaced target display system.

13. The apparatus of claim 12, wherein the interlaced target display system is one of an NTSC-compliant target display system and a PAL-compliant target display system.

14. The apparatus of claim 12, wherein the scan format of the original input picture data is one of an NTSC source-input format, a motion picture film source-input format, and a PAL source-input format.

15. The apparatus of claim 12, further comprising a television encoder connected to said resize memory and said target system selector and adapted to be connected to the interlaced target display system, said television encoder being capable of encoding and converting the output of said resize memory to obtain a converted output in an analog format that complies with video characteristics of the television system specification of the interlaced target display system, and being adapted to provide the converted output to the interlaced target display system.

16. The apparatus of claim 12, wherein:
when the scan format of the original input picture data is an NTSC source-input format, and the interlaced target display system is an NTSC-compliant target display system, said display controller controls said resize memory such that the even and odd fields of each of the resized frames are outputted in two immediately succeeding even and odd field times.

17. The apparatus of claim 12, wherein:
when the scan format of the original input picture data is a motion picture film source-input format, and the interlaced target display system is an NTSC-compliant target display system, said display controller controls said resize memory such that the even and odd fields of every two of the resized frames are outputted in five immediately succeeding even and odd field times.

18. The apparatus of claim 12, wherein:
when the scan format of the original input picture data is a PAL source-input format, and the interlaced target display system is an NTSC-compliant target display system, said display controller controls said resize memory such that the even and odd fields of every five of the resized frames are outputted in twelve immediately succeeding even and odd field times.

19. The apparatus of claim 12, wherein:
when the scan format of the original input picture data is a PAL source-input format, and the interlaced target display system is a PAL-compliant target display system, said display controller controls said resize memory such that the even and odd fields of each of the resized frames are outputted in two immediately succeeding even and odd field times.

20. The apparatus of claim 12, wherein:
when the scan format of the original input picture data is an NTSC source-input format, and the interlaced target display system is a PAL-compliant target display system, said display controller controls said resize memory such that the even and odd fields of every six of the resized frames are outputted in ten immediately succeeding even and odd field times.

21. The apparatus of claim 12, wherein:
when the scan format of the original input picture data is a motion picture film source-input format, and the interlaced target display system is a PAL-compliant target display system, said display controller controls said resize memory such that the even and odd fields of every twelve of the resized frames are outputted in twenty-five immediately succeeding even and odd field times.

22. The apparatus of claim 12, wherein the input video source is a video compact disc, and said video input unit includes a video compact disc drive adapted to be loaded with the input video source.

23. The apparatus of claim 12, wherein said display controller comprises:
a frame timing generator connected to said target system selector so as to receive the select signal therefrom, said frame timing generator being operable so as to generate frame rate signals corresponding to frame scanning characteristics of the television system specification of the interlaced target display system;

a frame counter connected to said frame timing generator, said frame counter performing a counting operation to generate a count output corresponding to the frame rate signals from said frame timing generator;

an interlace address counter connected to said resize memory to control the output of the resized frames from said resize memory, said interlace address counter counting a set of consecutive even addresses that correspond to even lines of the resized frames during the even field times and a set of consecutive odd addresses that correspond to odd lines of the resized frames during the odd field times; and a determining unit connected to said frame counter, said video decoder unit and said interlace address counter, said determining unit determining an addressing sequence for said interlace address counter to address the resized frames stored in said resize memory based on the count output from said frame counter and the title format information from said video decoder unit.

* * * * *